(12) United States Patent
Allen et al.

(10) Patent No.: US 12,210,202 B2
(45) Date of Patent: Jan. 28, 2025

(54) TERMINAL ENCLOSURE

(71) Applicant: CommScope Technologies LLC, Hickory, NC (US)

(72) Inventors: Barry Wayne Allen, Siler City, NC (US); Rohit D. Kulkarni, Durham, NC (US); William Alan Carrico, Raleigh, NC (US)

(73) Assignee: CommScope Technologies LLC, Hickory, NC (US)

( * ) Notice: Subject to any disclaimer, the term of this patent is extended or adjusted under 35 U.S.C. 154(b) by 131 days.

(21) Appl. No.: 18/044,819

(22) PCT Filed: Sep. 10, 2021

(86) PCT No.: PCT/US2021/049881
§ 371 (c)(1),
(2) Date: Mar. 10, 2023

(87) PCT Pub. No.: WO2022/056274
PCT Pub. Date: Mar. 17, 2022

(65) Prior Publication Data
US 2023/0367089 A1    Nov. 16, 2023

Related U.S. Application Data (60) Provisional application No. 63/077,298, filed on Sep. 11, 2020.

(51) Int. Cl.
*G02B 6/44* (2006.01)
(52) U.S. Cl.
CPC ......... *G02B 6/4445* (2013.01); *G02B 6/4471* (2013.01)

(58) Field of Classification Search
CPC ........................... G02B 6/4445; G02B 6/4471
See application file for complete search history.

(56) References Cited

U.S. PATENT DOCUMENTS

| | | | |
|---|---|---|---|
| 7,013,074 B2 | 3/2006 | Battey et al. | |
| 7,512,304 B2 * | 3/2009 | Gronvall | G02B 6/4477 385/139 |
| 7,539,387 B2 | 5/2009 | Mertesdorf et al. | |
| 7,558,458 B2 | 7/2009 | Gronvall et al. | |
| 7,805,044 B2 | 9/2010 | Reagan et al. | |
| 8,213,760 B2 | 7/2012 | Rudenick et al. | |
| 2005/0145522 A1 * | 7/2005 | Bloodworth | G02B 6/4453 206/409 |
| 2005/0175307 A1 * | 8/2005 | Battey | G02B 6/445 385/135 |
| 2018/0185782 A1 | 7/2018 | Subramaniyam | |

FOREIGN PATENT DOCUMENTS

| | | |
|---|---|---|
| KR | 1020130105247 A | 9/2013 |
| KR | 1020140082441 A | 7/2014 |
| WO | 2013050320 A2 | 4/2013 |
| WO | 2020154408 A1 | 7/2020 |
| WO | 2020160995 A1 | 8/2020 |
| WO | 2020185882 A1 | 9/2020 |

OTHER PUBLICATIONS

International Search Report and Written Opinion for PCT/US2021/049881 mailed Dec. 23, 2021.

* cited by examiner

*Primary Examiner* — Sung H Pak
(74) *Attorney, Agent, or Firm* — Merchant & Gould P.C.

(57) ABSTRACT

A glass fiber reinforced wall for a fiber optic cable enclosure having variable wall thicknesses between stiffening ribs to improve durability against impact loads.

15 Claims, 8 Drawing Sheets

TERMINAL ENCLOSURE

CROSS-REFERENCE TO RELATED APPLICATION

This application is being filed as a National Stage Application of PCT International Patent Application PCT/US2021/049881, filed on Sep. 10, 2021 and claims the benefit and priority of U.S. Patent Application Ser. No. 63/077,298, filed on Sep. 11, 2020; the disclosures of which are incorporated herein by reference in their entireties.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Fiber optic enclosures and optical fiber connectors are an important part of most fiber optic communication systems. Fiber optic enclosures are incorporated into fiber optic networks to facilitate providing access to optical fibers of fiber optic network cables. Fiber optic enclosures often house components such as splice trays, passive optical splitters, fiber optic adapters, fiber optic connectors, connector storage regions, connection fields/panels, connectorized pigtails, wavelength divisional multi-plexers and other components. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

Many fiber optic enclosures are designed to be installed in outside environments and are environmentally sealed. Example fiber optic enclosures for use in outside environments are disclosed by U.S. Pat. Nos. 7,512,304; 7,558,458; 8,213,760; 7,805,044; 7,539,387; and 7,013,074. A typical fiber optic enclosure of this type includes at least one sealed cable port for routing a fiber optic network cable into the enclosure. This type of enclosure can also include sealed connector ports for interfacing with connectorized drop cables. Optical fibers of the fiber optic network cable routed into the enclosure are often accessed within the enclosure and spliced to another cable such as a drop cable, directly connectorized or spliced to connectorized pigtails. When the fibers are connectorized, the connectorized ends can be plugged into inner ends of fiber optic adapters incorporated into the sealed connector ports. In the field, outer ends of the fiber optic adapters can be used to receive ruggedized fiber optic connectors corresponding to drop cables to provide optical connections between the drop cables and optical fibers of the fiber optic network cable without having to access an interior of the enclosure.

SUMMARY

The present invention relates to a wall for an enclosure with improved shock load or impact resistance. In particular, the present invention relates to a wall for fiber optic cable enclosures and terminals that have a cold temperature impact resistance requirement. The wall has a length, a width and a depth, and defines a longitudinal axis that extends along the length and bisects the width. The length of the wall extends between first and second ends of the wall, and the width extends between first and second edges of the wall. The wall includes a main wall portion having an inner side, an outer side and a wall thickness that extends along the depth of the wall between the inner and outer sides. The wall also includes a plurality of ribs integrally formed with the outer side of the main wall portion. The ribs are positioned parallel to one another and extend along the length of the wall. Each ribs has a rib height that extends along the depth of the wall.

The wall also includes first, second, and third sections that extend along the length of the wall. The first section is centered between the first and second edges of the wall and are positioned to include the longitudinal axis. The third sections are located adjacent to the first and second edges of the wall. The second sections are located between the first and the third sections. Ribs are located at the first, second and third sections and are arranged in a configuration that is symmetric about the longitudinal axis.

The main wall section has a thickness that varies across the width of the wall section. The main wall section has a first average thickness at the first section, a second average thickness at the second sections, and a third average thickness at the third sections. The first average thickness is larger than the second average thickness and the second average thickness is larger than the third average thickness.

The ribs have a first average height value at the first section, a second average height value at the second sections and a third average height value at the third sections. The first average height value is smaller than the second average height value, and the second average height value is smaller than the third average height value.

Finally, the ribs are separated from one another across the width of the wall by center-to-center spacings. There is a first average spacing value at the first section, a second average spacing value at the second sections and a third average spacing value at the third sections. The first average spacing value is smaller than the second average spacing value, and the second average spacing value is smaller than the third average spacing value.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Referring now to the figures, the present invention relates to the configuration of stiffening ribs and variations in wall thickness between the ribs of a wall for a fiber optic enclosure made of a polymeric material that in one example can include glass fiber reinforced polypropylene. Although the wall shown is intended to be used with fiber optic cable enclosures, similar designs may alternatively be used in other applications without departing from the invention.

Fiber optic cable enclosures made for the outdoor environment are susceptible to shock or mechanical impact loads throughout a wide range of temperatures. One example test used to determine cold weather impact strength is to place an enclosure in a −15° C. environment and drop a 1 KG steel ball from a height of one meter onto the enclosure.

Figure 1:
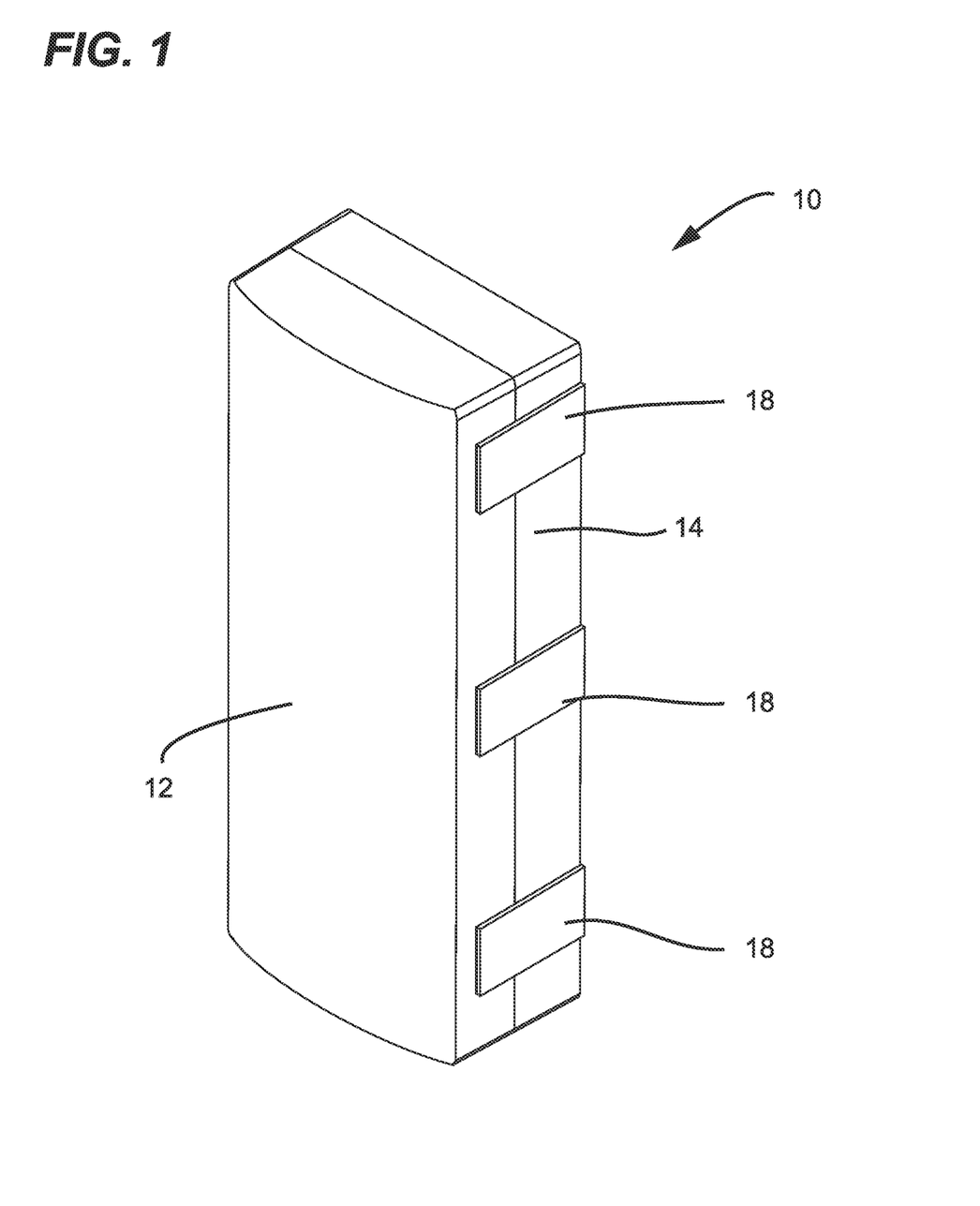
FIG. 1 is a perspective view of one embodiment of an enclosure for receiving fiber optic cable, showing one side of the enclosure.
Figure 2:
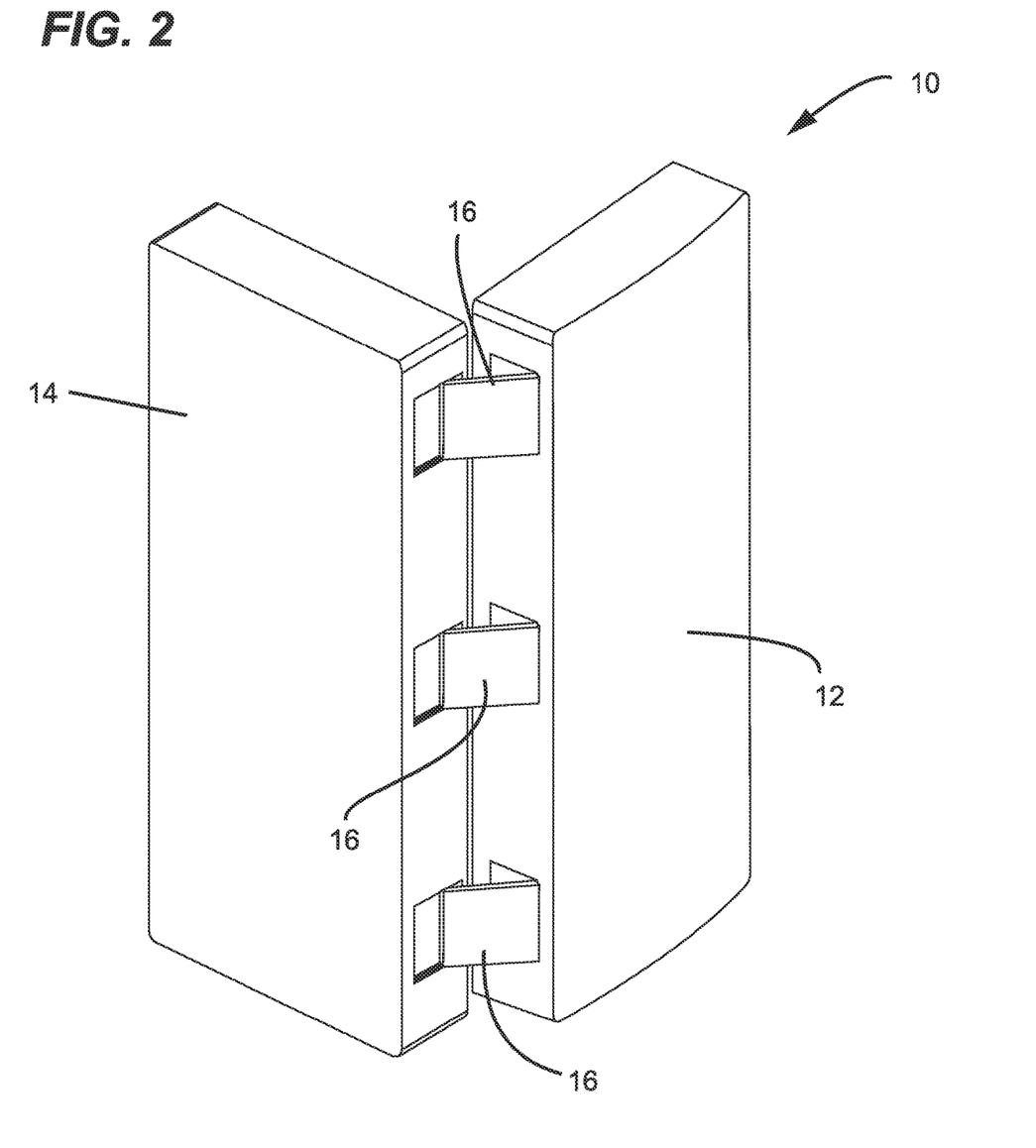
FIG. 2 is another perspective view of the enclosure of FIG. 1, showing another side of the enclosure.

FIGS. 1-2 show one example configuration of a typical fiber optic enclosure 10. Fiber optic enclosure 10 includes a first wall 12 and a second wall 14. First wall 12 and second wall 14 are attached by a hinge 16 on one side of enclosure 10. Opposite hinge 16 are a plurality of latches 18 to securely close enclosure 10. Walls 102, 202 shown in FIGS. 3-6 may replace one or both of first wall 12 and second wall 14 in fiber optic enclosure 10.

Figure 3:
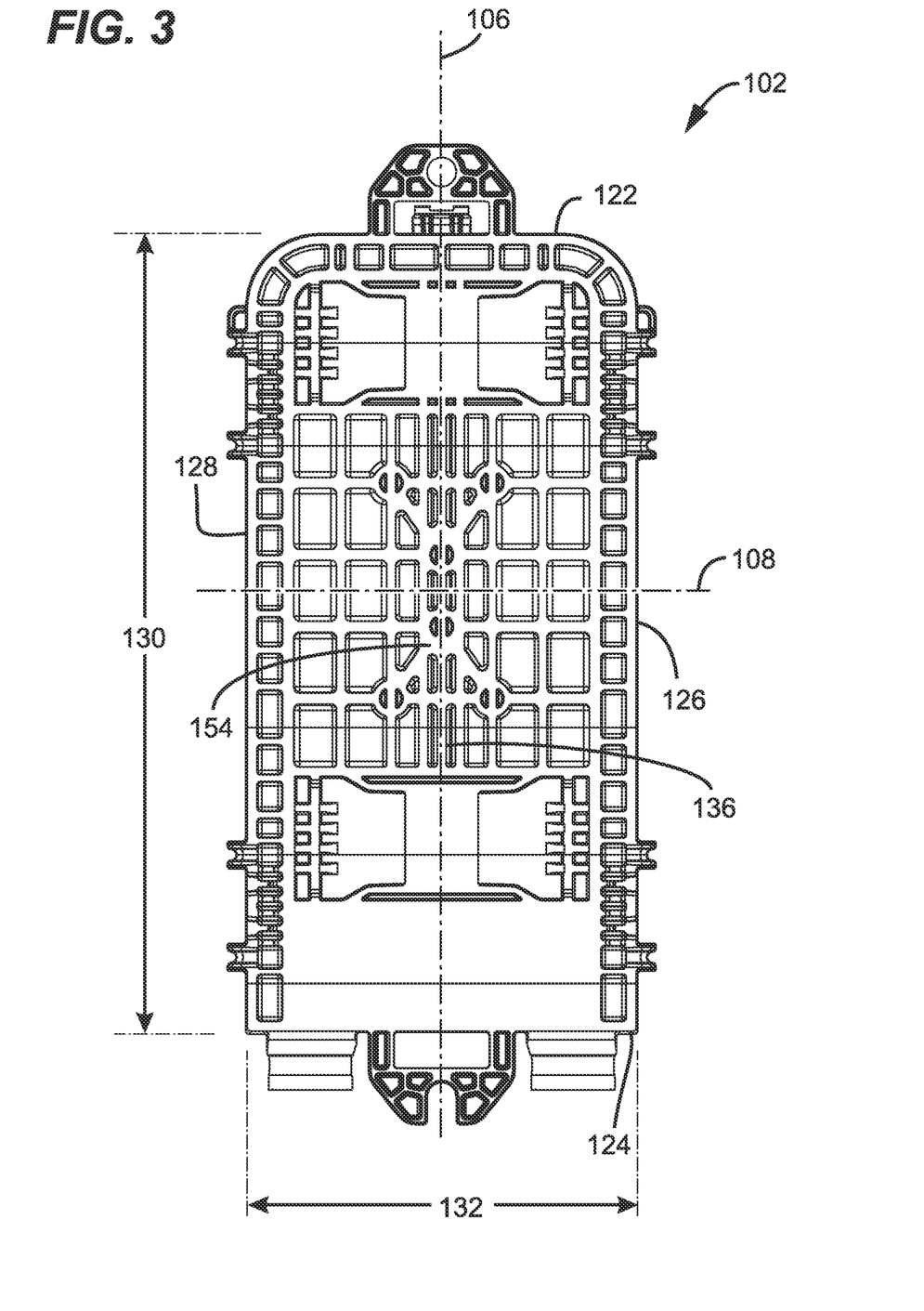
FIG. 3 is a front view of one wall of an enclosure for receiving fiber optic cable in accordance with the invention, showing the wall's longitudinal and transverse axes.
Figure 4:
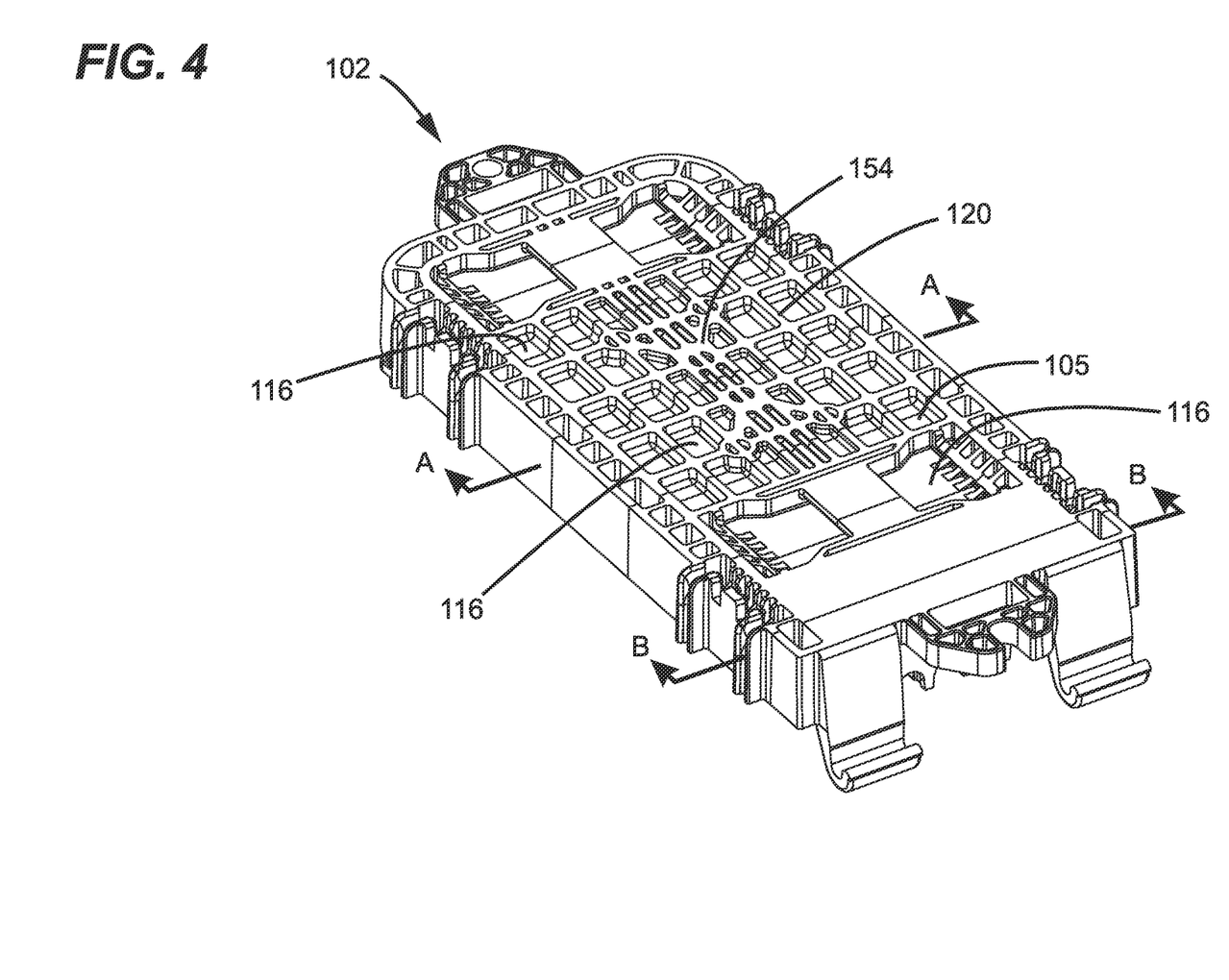
FIG. 4 is a perspective view of the wall of FIG. 3, showing the orientation and distribution of stiffening ribs integrally formed in the wall.

FIGS. 3-4 show one embodiment of a wall 102 in accordance with the invention. As shown in FIG. 3, first wall 102 includes a longitudinal axis 106 and a transverse axis 108. In the embodiment shown, first wall 102 could be either first wall 12 or second wall 14 and in one example is made using a molding process and a polymeric material such as glass fiber reinforced polypropylene, but any other suitable material may be used without departing from the invention. Wall 102 can pass the aforementioned 1 KG drop test when made from a variety of materials, including glass fiber reinforced polypropylene.

Wall 102 includes a wall main portion 105, which includes an inner side 114, outer side 116, depth 117, nominal wall thickness 118 (see FIG. 4B), and a plurality of ribs 120. The rib configuration and variations in wall thickness improves cold weather impact performance of wall 102 as compared to existing walls made of the same material, without significant drawbacks typically associated with variations in wall thickness. Wall 102 further includes first and second ends 122, 124, which define the length 130 of the wall. Similarly, wall 102 includes first and second edges 126, 128, which define the width 132 of the wall. In the embodiment shown, length 130 is greater than width 132, but any suitable dimensions may be used without departing from the invention. Ribs 120 are integrally formed with outer side 116 and have a rib height 134 that extends from the outer side. Rib height 134 is measured as the distance from outer side 116 to the top of a rib 120 (See FIG. 4A). Rib height 134 may vary as necessary to achieve the desired performance of wall 102. In some embodiments, rib height 134 may vary from rib to rib, whereas in other embodiments, the rib height for each rib 120 may be equal. In the embodiment shown, the rib heights 134 vary so that the tops of the ribs are all at the same height relative to outer side 116. Ribs 120 extend between first and second edges 126, 128 and are positioned parallel to longitudinal axis 106.

In the embodiment shown, a first section 136 is centered between the first edge 124 and second edge 126 and positioned to include the longitudinal axis 106. First section 136 extends along the length of wall 102. Third sections 138 are located adjacent to the first edge 124 and second edge 126 and extend along the first and second edges along the length of wall 102. Second sections 140 are located between third sections 138 and first section 136. Ribs 120 are located at each of the first, second, and third sections 136, 140, 138 and are arranged symmetrically about longitudinal axis 106.

Figure 4A:
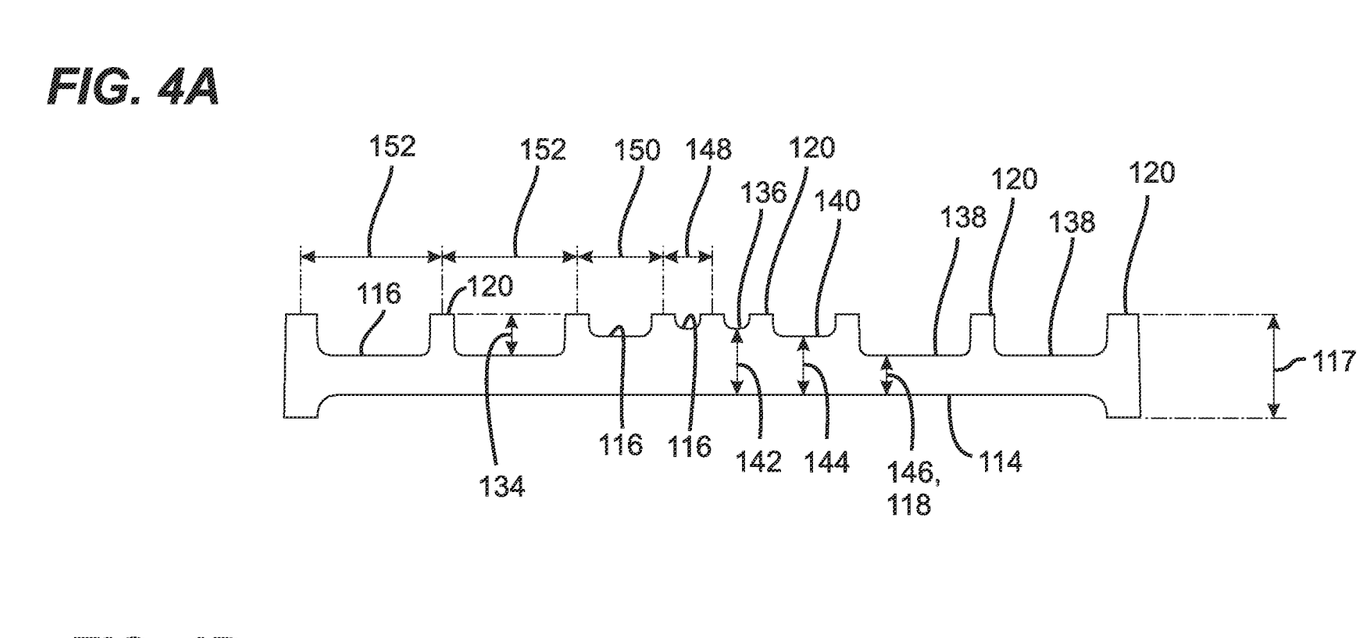
FIG. 4A is a section view of the wall of FIG. 3, taken generally along the line A-A in FIG. 4, showing the positioning of the ribs and the thickness of the wall between the ribs.
Figure 4B:
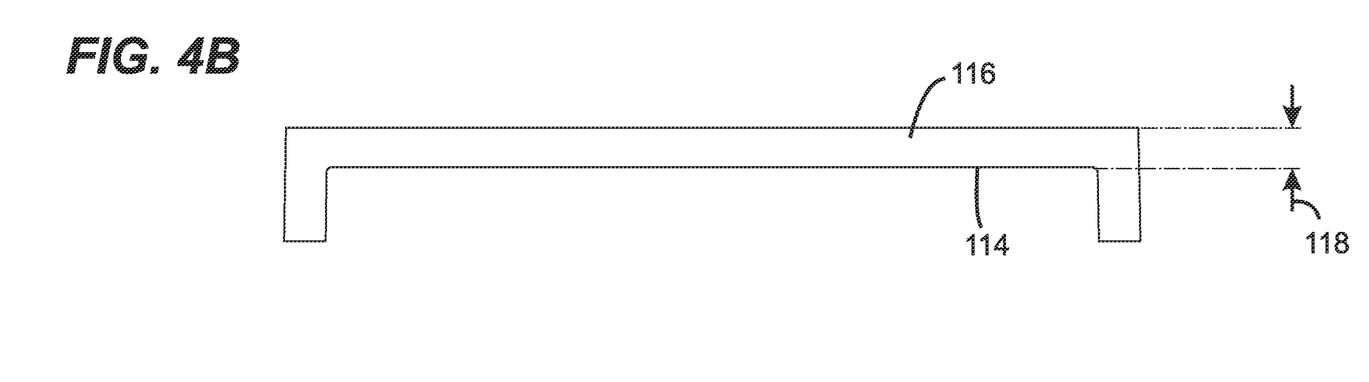
FIG. 4B is another section view of the wall of FIG. 3, taken generally along the line B-B in FIG. 4, showing the nominal thickness of the wall where the wall does not include ribs.

Turning now to FIG. 4A, a cross-sectional view of wall 102 is shown. As can be seen in the figure, the thickness of wall 102 varies across the width of the wall. In particular, wall 102 has a first average thickness 142 at first section 136, a second average thickness 144 at second section 140, and a third average thickness 146 at third sections 138. Third average thickness 146 is the thinnest section and is equal to the nominal wall thickness 118 of wall 102. Second average thickness 144 is thicker than third average thickness 146, but thinner than first average thickness 142. In the embodiment shown, each subsequently thicker section increases in thickness by approximately ⅓, although any suitable variation may be used without departing from the invention. In certain examples, each subsequently thicker section increases in thickness by at least 10, 20 or 30 percent, although any suitable variation may be used without departing from the invention.

Continuing with FIG. 4A, ribs 120 are separated from one another across the width of wall 102 by center-to-center spacings. In the present embodiment, center-to-center spacing means a distance measured from the center of one rib 120 to the center of an adjacent rib. "Center-to-center spacing" may be used interchangeably with "distance between ribs." A first average center-to-center spacing 148 is measured between first section 136 and second section 140. Similarly, a second average center-to-center spacing 150 is measured between second section 140 and third section 138 and a third center-to-center spacing 152 is measured between third section 138 and the first or second edge 126, 128. As shown, first average center-to-center spacing 148 is less than second average center-to-center spacing 150, which in turn is less than third average center-to-center spacing 152. In the present embodiment, second average center-to-center spacing 150 is approximately one-third greater than first average center-to-center spacing 148. Likewise, third average center-to-center spacing 152 is approximately one-third greater than second average center-to-center spacing 150. Of course, the average center-to-center spacings 148, 150, 152 may vary slightly without departing from the invention. The distribution of ribs 120 across width 132, combined with increased wall thicknesses between the ribs toward the longitudinal axis results in a robust central portion 154 that distributes impact load across wall 102. An additional added benefit of the distribution of ribs 120 and variations in wall thicknesses is that glass fiber orientation can be controlled, which further strengthens central portion 154 and wall 102. In alternative examples, the second center-to-center spacing 150 increases by at least 10, 20 or 30 percent as compared to the first center-to-center spacing 148, and the third center-to-center spacing 152 increases by at least 10, 20 or 30 percent as compared to the second center-to-center spacing 150.

Figure 5:
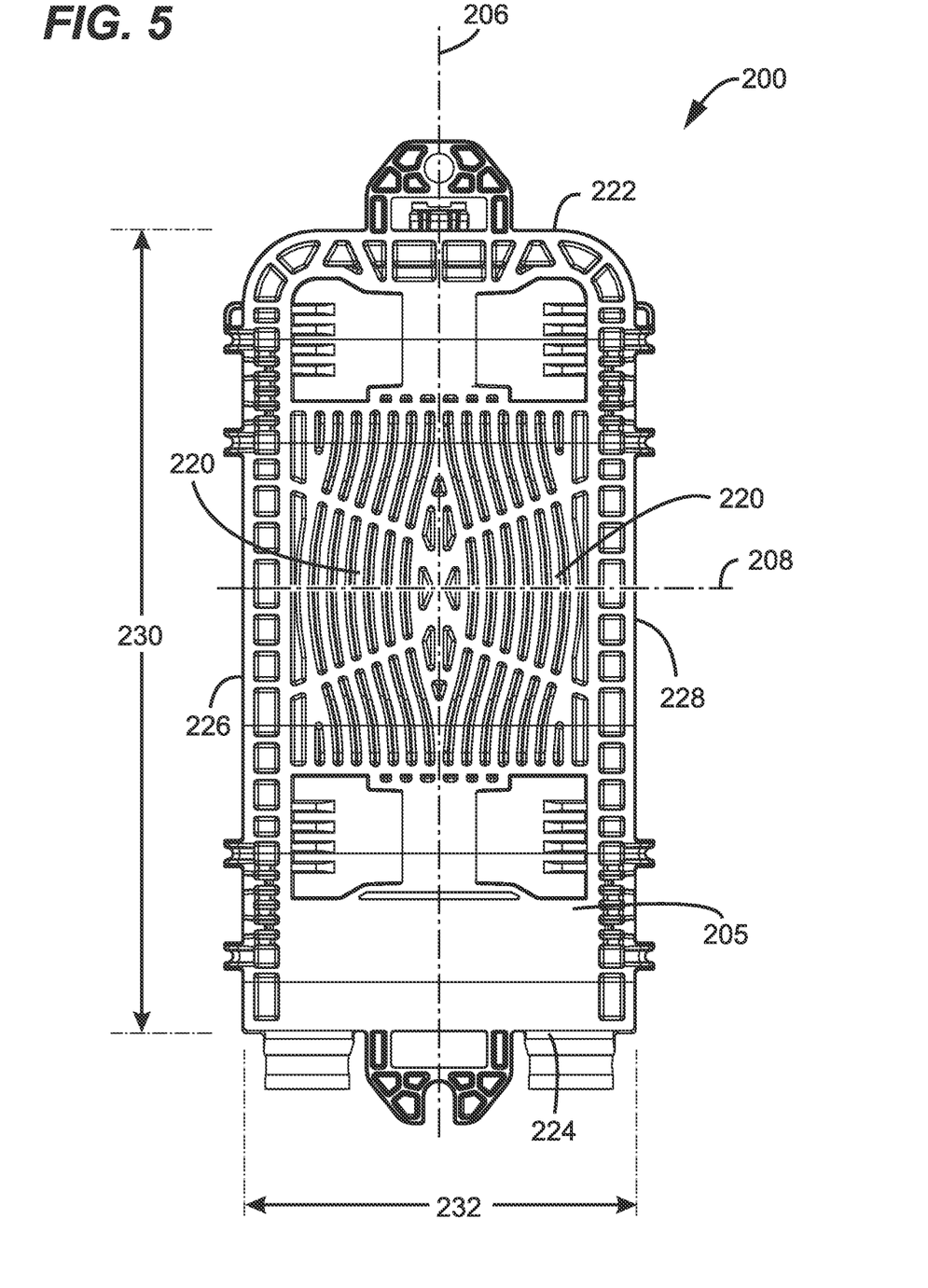
FIG. 5 is a front view of another embodiment of a wall of an enclosure for fiber optic cable in accordance with the invention, showing the wall's longitudinal and transverse axes.
Figure 6:
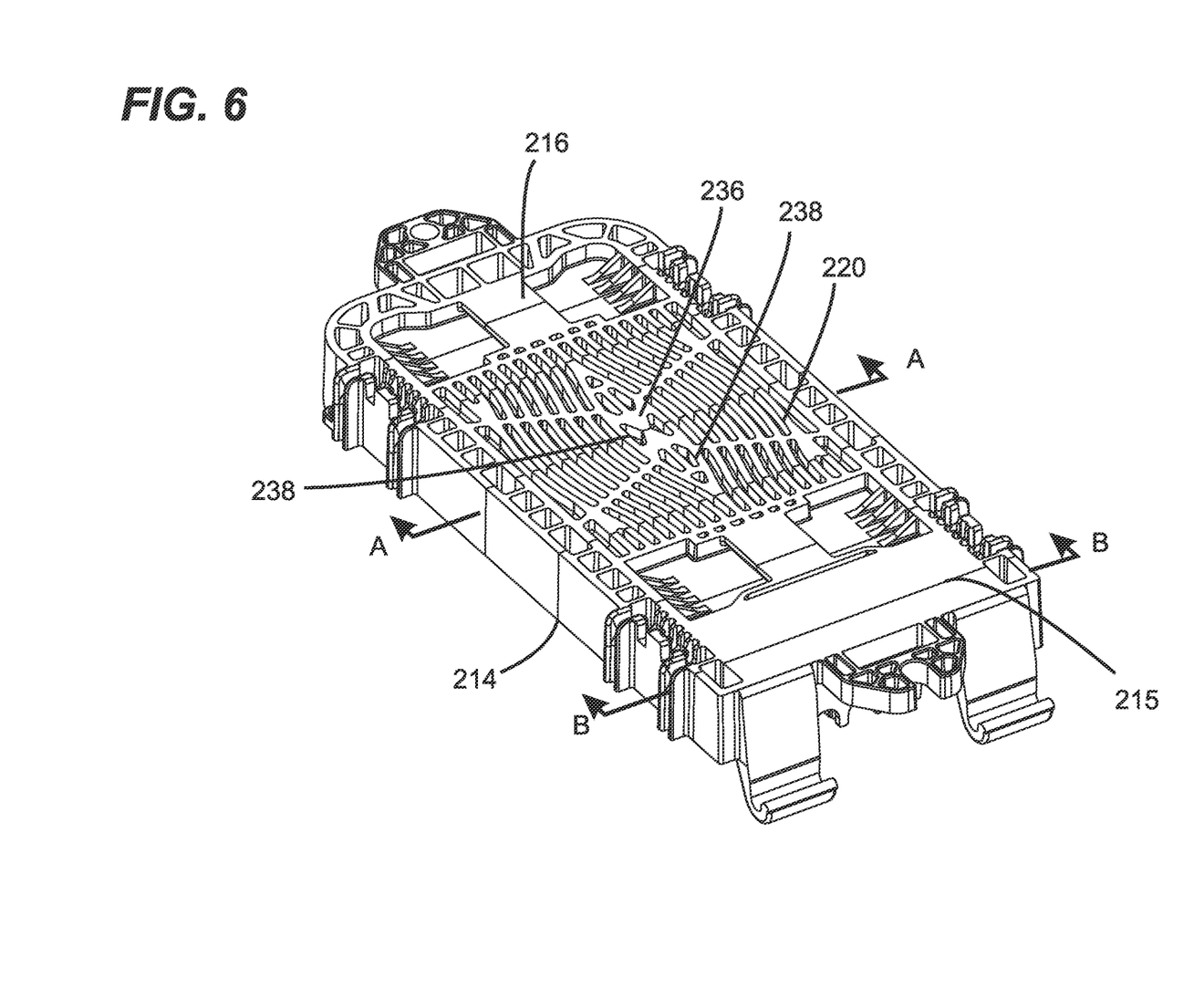
FIG. 6 is a perspective view of the wall of FIG. 5, showing the orientation and distribution of stiffening ribs integrally formed in the wall.

Turning now to FIGS. 5-6, a second embodiment of a wall 200 in accordance with the invention is shown. In many aspects, wall 200 is identical to wall 100. Wall 200 includes a wall main portion 205, which includes an inner side 214, outer side 216, nominal wall thickness 218, and a plurality of ribs 220. Wall 200 further includes first and second ends 222, 224, which define the length 230 of the wall. Similarly, wall 200 includes first and second edges 226, 228, which define the width 232 of the wall. In the embodiment shown, length 230 is greater than width 232, but any suitable dimensions may be used without departing from the invention. Ribs 220 are integrally formed with outer side 216 have a rib height 234 that extends from the outer side. Rib height 234 is measured as the distance from outer side 216 to the top of a rib 220. Rib height 234 may vary as necessary to achieve the desired performance of wall 200. In some embodiments, rib height 234 may vary from rib to rib, whereas in other embodiments, the rib height for each rib 220 may be equal.

Figure 6A:
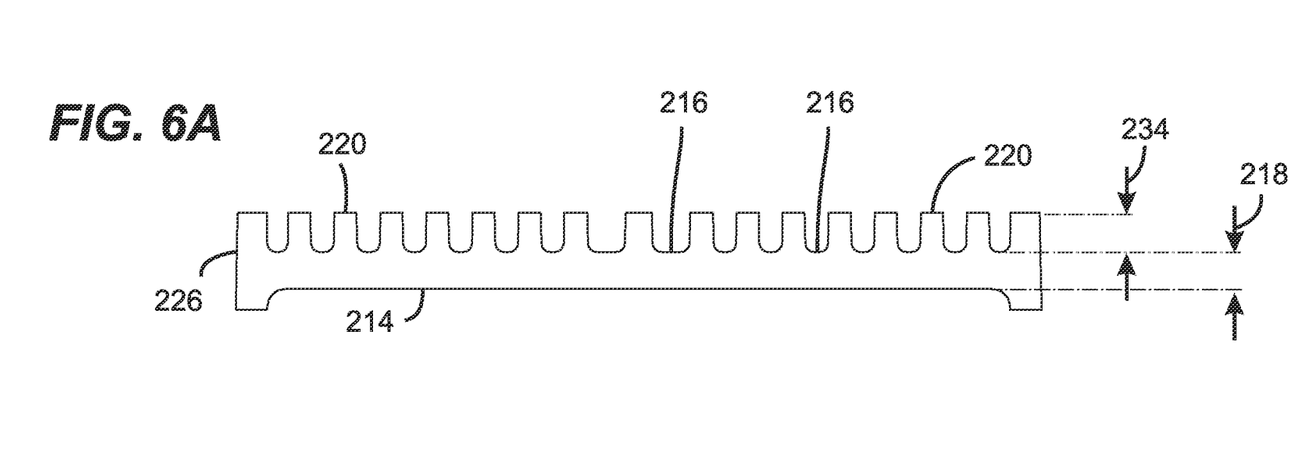
FIG. 6A is a section view of the wall of FIG. 5, taken generally along the line A-A in FIG. 6, showing the positioning of the ribs and the thickness of the wall between the ribs at approximately the center of the length of the wall.
Figure 6B:
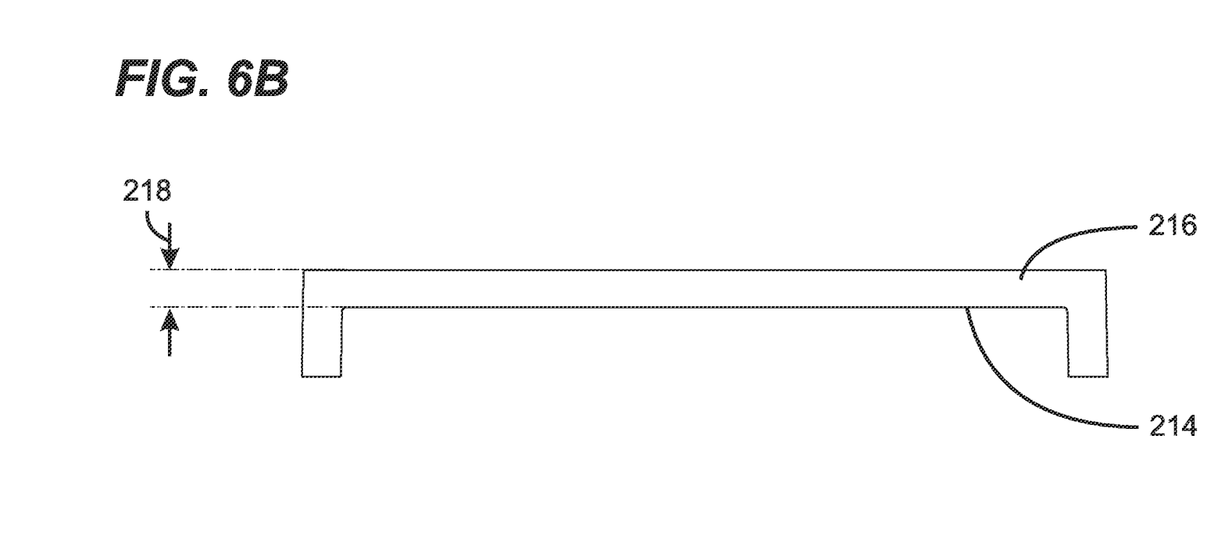
FIG. 6B is another section view of the wall of FIG. 5, showing the nominal thickness of the wall where the wall does not include ribs.

As shown in FIGS. 6, 6A and 6B, ribs 220 extend between first and second edges 226, 228 and are positioned along longitudinal axis 206. Ribs 220 are separated from one another across the width 232 of wall 200. In the embodiment shown, the distance between ribs 220 is the same across width 232, but the distance between the ribs may vary in alternative embodiments, as desired. Ribs 220 follow a curvilinear path, wherein the distance of each rib from longitudinal axis 206 varies across length 230. In particular, ribs 220 bend away from longitudinal axis 206 toward transverse axis 208. One consequence of bending ribs 220 away from longitudinal axis 206, is a center portion 236 having an average thickness equal to the nominal wall thickness 218 plus rib height 234. As shown, center portion 236 also includes pockets 238 formed in accordance with injection molding conventions to ensure acceptable material flow. Alternative embodiments may include pockets 238 of any suitable shape or size without departing from the invention. In certain examples, the ribs 220 have concave sides that face toward the longitudinal axis 106 and convex sides that face away from the longitudinal axis 106.

Although the invention has been herein described in what is perceived to be the most practical and preferred embodiments, the invention is not intended to be limited to the specific embodiments set forth above. Rather, modifications may be made by one of skill in the art of the invention without departing from the spirit or intent of the invention.

What is claimed is:

1. An enclosure comprising:
a wall having a length, a width and a depth, the wall also defining a longitudinal axis that extends along the length and bisects the width, the length extending between first and second ends of the wall, and the width extending between first and second edges of the wall;
the wall having a main wall portion having an inner side, an outer side and a nominal wall thickness that extends along the depth of the wall between the inner and outer sides;
the wall also including a plurality of ribs integrally formed with the outer side of the main wall portion, the ribs being parallel to one another and extending along the length of the wall, the ribs having rib heights that extend along the depth of the wall;
the wall including a first section that extends along the length of the wall, second sections that extend along the length of the wall, and third sections that extend along the length of the wall;
the first section being centered between the first and second edges and positioned to include the longitudinal axis, the third sections located adjacent the first and second edges of the wall and the second sections located between the first and the third sections, where ribs of the plurality of ribs are located at the first, second and third sections, and wherein the ribs are arranged in a configuration that is symmetric about the longitudinal axis;
the thickness of the main wall section having a first average thickness at the first section, a second average thickness at the second sections, and a third average thickness at the third sections, the first average thickness being larger than the second average thickness and the second average thickness being larger than the third average thickness;
the rib heights having a first average height value at the first section, a second average height value at the second sections and a third average height value at the third sections, the first average height value being smaller than the second average height value, and the second average height value being smaller than the third average height value; and
wherein the ribs are separated from one another across the width of the wall by center-to-center spacings, and wherein the center to center spacings have a first average spacing value at the first section, a second average spacing value at the second sections and a third average spacing value at the third sections, the first average spacing value being smaller than the second average spacing value, and the second average spacing value being smaller than the third average spacing value.

2. The enclosure of claim 1, wherein the third average thickness is equal to the nominal wall thickness.

3. The enclosure of claim 1, wherein the second average thickness is approximately one-third thicker than the nominal wall thickness.

4. The enclosure of claim 3, wherein the first average thickness is approximately one-third thicker than the second average thickness.

5. The enclosure of claim 1, wherein the second average spacing value is approximately one-third greater than the first average spacing value.

6. The enclosure of claim 1, wherein the third average spacing value is approximately one-third greater than the second average spacing value.

7. The enclosure of claim 1, wherein the wall is made of glass fiber reinforced polypropylene.

8. An enclosure comprising:
a wall having a longitudinal axis and a nominal wall thickness;
a plurality of ribs integrally formed and extending from the main body and disposed parallel to the longitudinal axis;
the plurality of ribs including at least a first, second, and third rib;
wherein each of the first, second, and third ribs has an identical rib disposed symmetrically on the other side of the longitudinal axis;

the first rib positioned a first average distance from the longitudinal axis;

the second rib positioned a second average distance from the longitudinal axis, wherein the spacing between the first rib and the second rib is greater than the spacing between the longitudinal axis and the first rib;

the third rib positioned a third average distance from the longitudinal axis, wherein the spacing between the second rib and the third rib is greater than the spacing between the first rib and the second rib;

the wall having a first wall thickness disposed between the longitudinal axis and the first rib, wherein the first wall thickness is greater than the nominal wall thickness;

a second wall thickness disposed between the first rib and the second rib, wherein the second wall thickness is less than the first wall thickness and is greater than the nominal wall thickness; and a third wall thickness disposed between the second rib and the third rib, wherein the third wall thickness is less than the second wall thickness and is greater than the nominal wall thickness.

9. The enclosure of claim 8, wherein additional ribs are positioned a distance from the longitudinal axis, wherein the distance between each additional rib and the foregoing rib is greater than the distance between the foregoing rib and the rib prior to the foregoing rib.

10. The enclosure of claim 8, wherein the wall thicknesses disposed between each subsequent rib becomes progressively thinner until the wall thickness is equal to the nominal wall thickness.

11. The enclosure of claim 8, wherein the wall is made of glass fiber reinforced polypropylene.

12. An enclosure comprising:

a wall having a main body with a longitudinal axis, a transverse axis, and a nominal wall thickness;

a plurality of ribs, each rib having a rib height, the ribs integrally formed and extending from the main body and disposed in pairs along and opposite the longitudinal axis;

the ribs following curvilinear paths that bend away from the longitudinal axis the closer the each path is to the transverse axis; and a center portion disposed between two ribs closest to the longitudinal axis, the center portion having an average thickness equal to the nominal wall thickness plus the rib height.

13. The enclosure of claim 12, wherein the center portion includes at least one pocket having a depth equal to the rib height.

14. The enclosure of claim 12, wherein the center portion includes at least one pocket having a depth less than the rib height.

15. The enclosure of claim 12, wherein the center portion includes at least one pocket having a depth greater than the rib height.

* * * * *